US005645669A

United States Patent [19]

Crankshaw et al.

[11] Patent Number: 5,645,669

[45] Date of Patent: Jul. 8, 1997

[54] METHOD FOR LABELING TRANSVERSE SIDES OF AN ARTICLE

[75] Inventors: Michael Crankshaw, Santa Fe Springs; William F. Akerboom, El Monte, both of Calif.

[73] Assignee: Label-Aire, Inc., Fullerton, Calif.

[21] Appl. No.: 398,434

[22] Filed: Mar. 3, 1995

Related U.S. Application Data

[62] Division of Ser. No. 147,736, Nov. 4, 1993, Pat. No. 5,421,948.

[51] Int. Cl.[6] .......... B32B 31/00

[52] U.S. Cl. .......... 156/212; 156/475; 156/486; 156/492

[58] Field of Search .......... 156/215, 521, 156/469, 285, 361, 542, 475, 483, 486, 488, 492, 568, 212

[56] References Cited

U.S. PATENT DOCUMENTS

| | | | |
|---|---|---|---|
| 1,057,096 | 3/1913 | Seymour | 156/521 |
| 4,026,754 | 5/1977 | Bogdanski et al. | 156/521 |
| 4,032,386 | 6/1977 | Fleet | 156/467 X |
| 4,061,526 | 12/1977 | Warshaw et al. | 156/468 |
| 4,255,120 | 3/1981 | Kucheck et al. | 156/285 |
| 4,314,869 | 2/1982 | Crankshaw | 156/215 |
| 4,337,108 | 6/1982 | Crankshaw et al. | 156/285 |
| 4,475,978 | 10/1984 | Bartl . | |
| 4,687,535 | 8/1987 | Voltmer | 156/361 |
| 4,781,786 | 11/1988 | Lerner et al. | 156/468 |
| 4,844,771 | 7/1989 | Crankshaw et al. . | |
| 5,030,311 | 7/1991 | Michal et al. | 156/521 X |
| 5,173,140 | 12/1992 | Vasilakes | 156/468 X |
| 5,209,808 | 5/1993 | Booth | 156/487 |

FOREIGN PATENT DOCUMENTS

| | | | |
|---|---|---|---|
| 2464195 | 9/1979 | France | 156/542 |

OTHER PUBLICATIONS

Webster's Ninth New Collegiate Dictionary, p. 992, 1990.

Label-Aire Inc., "Vial Labeller"—drawing 1977.

*Primary Examiner*—David A. Simmons
*Assistant Examiner*—Paul M. Rivard
*Attorney, Agent, or Firm*—Donald E. Stout

[57] ABSTRACT

A label applicator for applying a label to an article comprising a supporting structure, a label carrier adapted to receive and releasably retain a label and a carrier mount. The label carrier is mounted for rotation on the carrier mount. The carrier mount mounts the label carrier on the supporting structure for bodily movement between a label receiving position in which the label carrier can receive and releasably retain a label and a label applying position in which the label carrier can apply the label to the article.

21 Claims, 8 Drawing Sheets

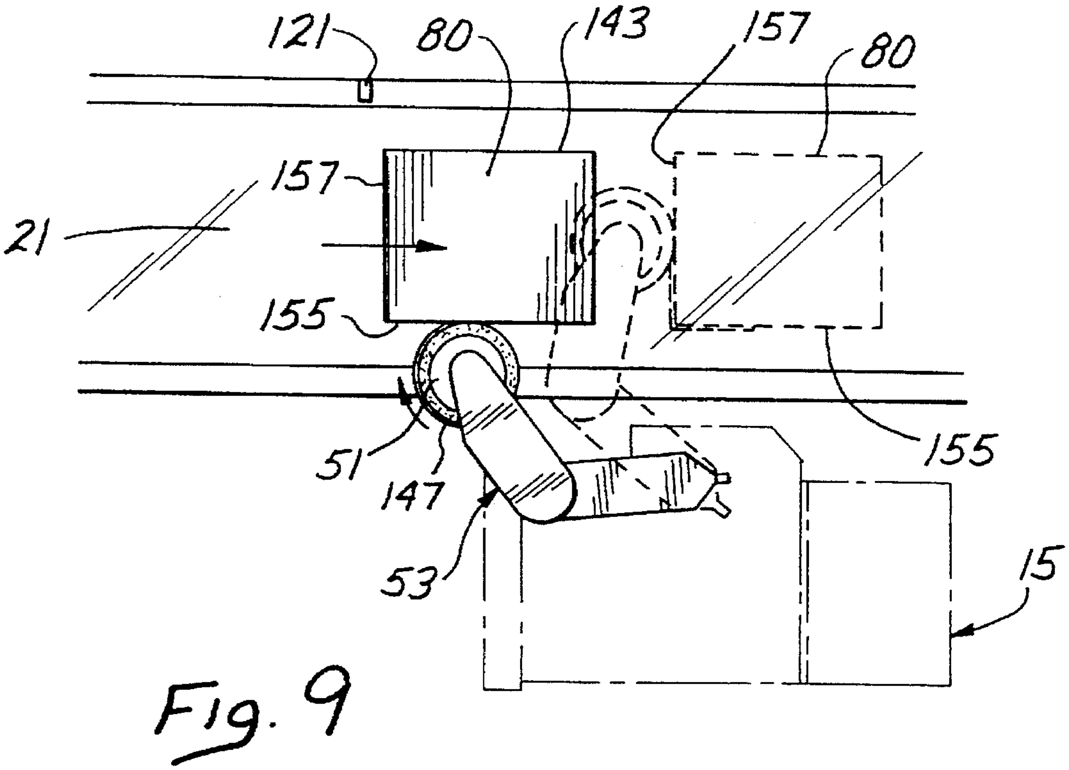
Fig. 9
Fig. 10
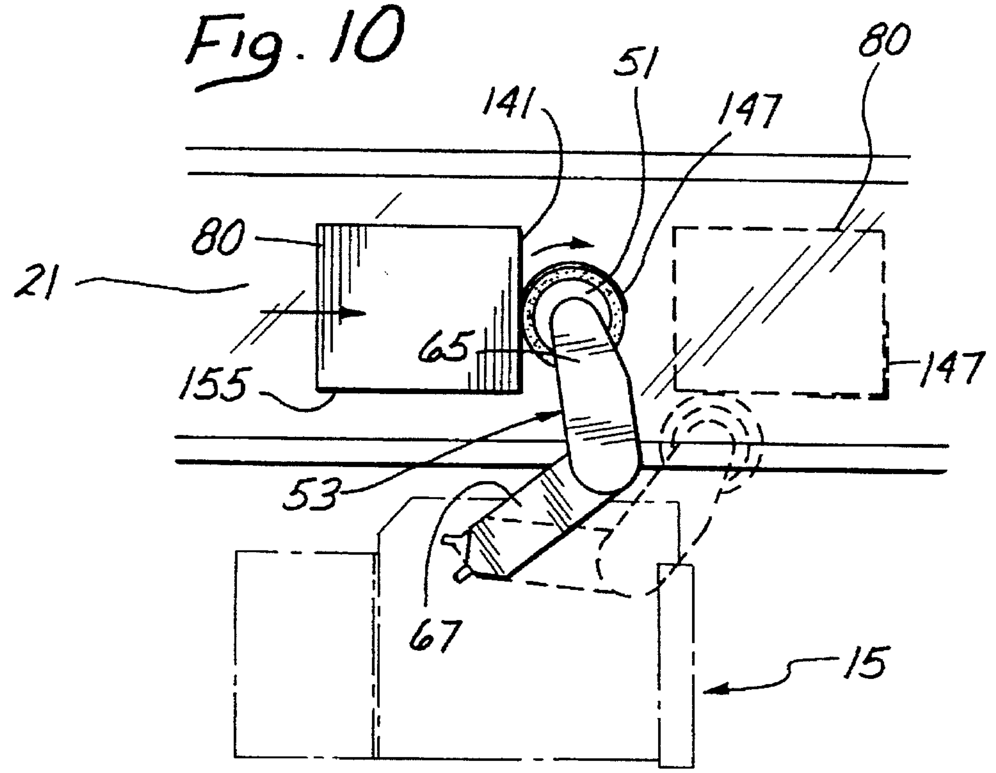

METHOD FOR LABELING TRANSVERSE SIDES OF AN ARTICLE

This is a division of application Ser. No. 08/147,736, filed Nov. 4, 1993, now U.S. Pat. No. 5,421,948.

BACKGROUND OF THE INVENTION

A typical label applicator applies one or more labels to an article as the article is conveyed past the label applicator. For example, a label applicator may dispense a label onto a label receiver which transfers the label to the article by tamping of the label against the article and/or by a blast of air under pressure.

It is sometimes necessary or desirable to apply a single label to multiple faces of an article. For example in the case of an article, such as a box, which is in the form of a rectangular solid it may be desirable to apply a label to the front face and one of the side faces of the box or to the back face and one of the side faces of the box. In either case, the label is adhered to two faces of the box and wraps around the corner of the box.

One prior art technique for accomplishing this includes dispensing a label onto a side face of an article being moved through a labeling station with one end portion of the label overhanging and extending beyond the edge of the article. A separate roller is then used to press this overhanging region of the label against the front or back face of the article. Unfortunately, this system is complex and not as accurate as desired, especially for long labels.

SUMMARY OF THE INVENTION

This invention provides a label applicator and method which generally overcomes the disadvantages noted above with the prior art. With this invention, a label can be accurately applied to first and second faces of an article and this result can be easily attained for labels of different lengths. Although the features of this invention are particularly adapted for corner labeling, i.e. the labeling of first and second faces of an article, the label applicator of this invention can also be used to apply labels to curved or round articles such as pails, tires or drums and to a single surface, such as a front, back, top, bottom or side face, of an article. Thus, the label applicator can apply labels to one or more surfaces which can be flat or curved. Also the features of this invention can be used to apply two or more labels to a single article such as, for example, the application of one label to the front face and another to a side face of an article. In the typical corner labeling situation, the faces to which the label is applied are generally flat and generally transverse to each other.

Some of the features of this invention can be embodied in an label applicator which includes a supporting structure, a label carrier adapted to receive and releasably retain a label and a carrier mount. The carrier is mounted for rotation on the carrier mount and the carrier mount mounts the label carrier on the supporting structure for bodily movement between a label receiving position in which the label carrier can receive and releasably retain a label and a label applying position in which the label carrier can apply the label to the article. This construction enables the label carrier to apply the label to first and second faces of the article.

The mounting of the label carrier for rotation is important for several reasons. For example, the rotatable label carrier can be rotated, preferably by the moving article to which the label is being applied, to bring about application of a first region of the label to a first face of the article and application of a second region of the label to a second face of the article. In addition, rotation of the label carrier is useful when the label is being dispensed onto the label carrier. In this event, the angle through which the label carrier rotates can be used to position the label to assure that it is accurately applied to the article.

Although the carrier mount can move the label carrier along any desired path between the label receiving position and the label applying position, preferably the carrier mount mounts the label carrier for pivotal movement about a pivot axis between the label receiving position and the label applying position. This pivot axis is spaced from the rotational axis about which the label carrier rotates.

The label applicator preferably includes a motor for moving the label carrier about the pivot axis between the label receiving position and the label applying position. In a preferred construction, one motor, such as a linear actuator, is used to move the label carrier from the label receiving position to the label applying position and to retract the label carrier from the label applying position to the label receiving position. The label carrier is movable about the pivot axis independently of the motor in the label applying position. This enables the article being labeled to move the carrier mount and the label carrier about the pivot axis to thereby cause the label carrier to move along at least one of the faces of the article as the label is being applied to such one face. For example, this face would ordinarily be a face which is transverse to the direction of the path of movement of the article through the label applying station. The label carrier is biased against the article during labeling.

The label applicator includes a carrier drive for rotating the label carrier and for terminating rotation of the label carrier at the desired angular position of the label carrier. This desired angular position is brought about after the label carrier is rotated through a predetermined angle which is a function of the length of the label received by the label carrier.

In a preferred construction, the carrier drive includes a motor rotating the label carrier and a clutch for transmitting power from the motor to the label carrier. Although the termination of rotation of the label carrier can be brought about in different ways, this is preferably accomplished by using a stepping motor and causing it to take a predetermined number of steps to accurately position a label of predetermined length. The clutch is preferably disengaged before the label carrier reaches the label applying position. Consequently, the label carrier is then free to be rotated by virtue of contact with the moving article so it can apply the label to the article.

In one preferred construction, the carrier mount includes an arm coupled to the label carrier and mounted on the supporting structure for pivotal movement about the pivot axis so that the arm can pivot the label carrier between the label receiving position and the label applying position. To reduce the likelihood of the arm being contacted by the article to be labeled, the arm preferably defines an obtuse angle of less than 180 degrees which opens in a first direction, and this may be accomplished by an arm which includes inner and outer sections coupled together.

Preferably a fluid actuator is provided for biasing the label carrier against the article during labeling. A mechanical linkage between the actuator and the carrier mount causes the label carrier to exert a reduced force on the article as the carrier mount is moved from the label applying position toward the label receiving position.

The features of this invention can be used to label the front and side or the back and side faces of an article. Thus, with this invention all four corners of a box can be labeled.

According to the method of this invention, a label is releasably retained on a rotatable label carrier in a label applying position in the path of movement of an article. Next, a first face of the article is contacted with a first region of the label as the article moves along the path and the label carrier is rotated about a rotational axis to apply the first region of the label to the first face of the article. Next, a second face of the article is contacted with a second region of the label as the article moves along the path and the label carrier is rotated about the rotational axis to apply the second region of the label to the second face of the article. The label carrier is moved along one of the faces of the article as the label is being applied to such one face. This movement of the label carrier along such one face of the article in combination with rotation of the label carrier provides for labeling of the first and second faces.

The method of this invention also includes dispensing of a label onto a label carrier with the label carrier rotating and with the label carrier being in the label receiving position and moving the label carrier from the label receiving position to a label applying position. Rotation of the label carrier is terminated to position the label and the label is then applied to the article by forcing the label against the article and with the article acting to rotate the label carrier as the label is applied to the article.

The invention, together with additional features and advantages thereof may best be understood by reference to the following description taken in connection with the accompanying illustrative drawings.

BRIEF DESCRIPTION OF THE DRAWINGS

FIGS. 9, 10 and 11 are plan views illustrating how the features of this invention can be used to apply labels to the faces which define the other three corners of a rectangular article.

DESCRIPTION OF THE PREFERRED EMBODIMENT

Figure 1:
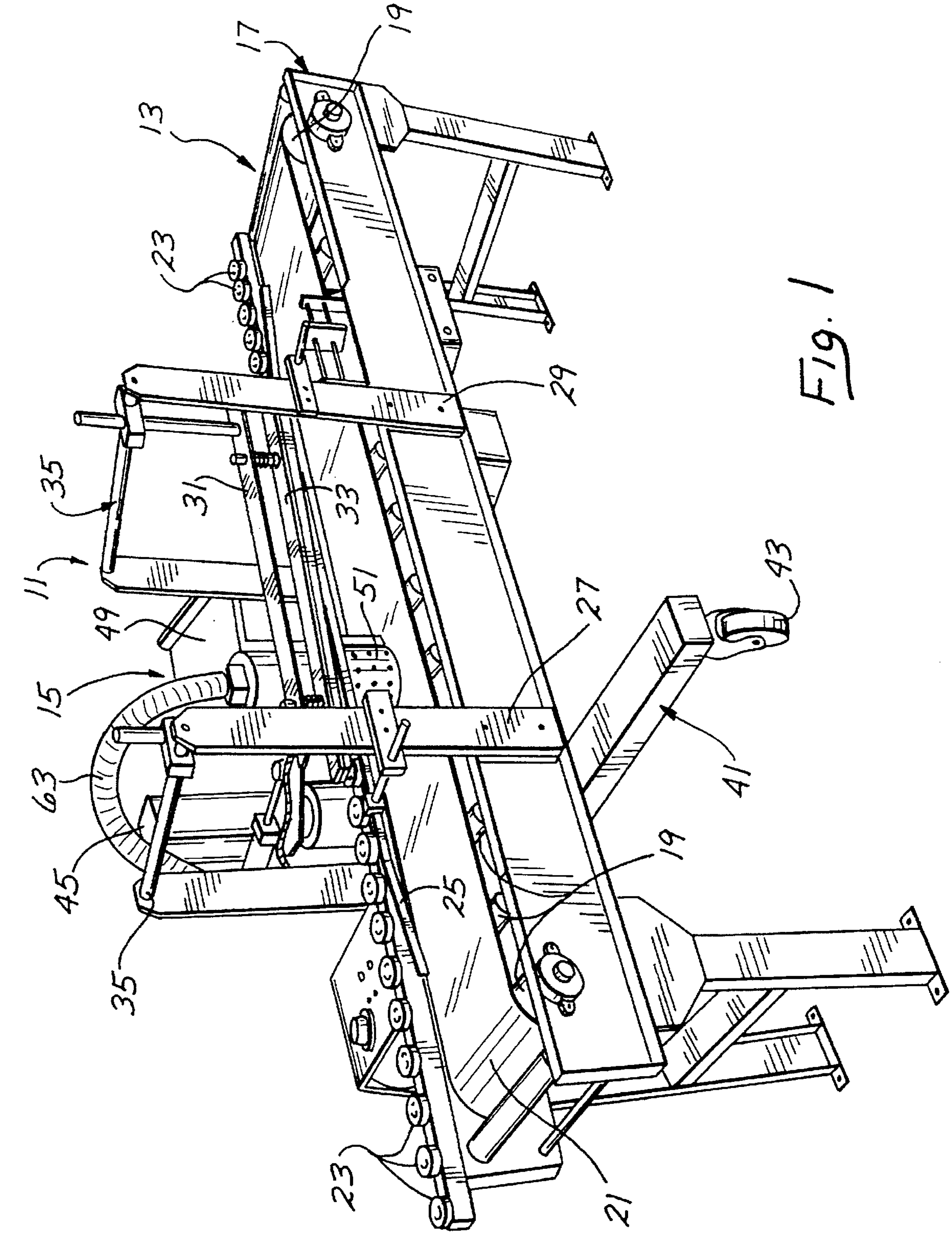
FIG. 1 is a perspective view of a label applicator constructed in accordance with the teachings of this invention.

FIG. 1 shows a label applicator 11 which generally comprises a conveyor unit 13 and a label applying unit 15. The conveying unit 13 is provided for conveying articles past the label applying unit 15 and may or may not be considered as part of the label applicator 11.

The conveying unit 13 may be of various different constructions, and in this embodiment includes a roller bed 17 of table-like construction forming a supporting structure for the conveying unit. The conveying unit 13 also includes rollers 19 rotatably mounted on the roller bed 17 and an endless, flexible conveyor belt 21 extending over the rollers. At least one of the rollers 19 is a drive roller which can be driven by a motor (not shown) to cause the belt 21 to move, and conveyors of this type are known.

To guide articles moving on the belt 21, the conveying unit 13 includes rollers 23 rotatably mounted along one longitudinally extending edge of the roller bed 17 and an adjustable rail 25 suitably mounted on support arms 27 and 29 which are mounted on the roller bed 17 and which project above the belt 21.

An adjustable hold down assembly 31 may also be provided to hold down articles on the belt 21 as they are being labeled. In this embodiment, the hold down assembly 31 comprises a spring loaded hold down rail 33 extending generally longitudinally of the belt 21. The hold down rail 31 is suitably mounted on inverted, generally U-shaped supports 35 so that the position of the hold down rail 33 across the conveyor 21 can be adjusted and so that the height of the hold down rail can also be adjusted in a conventional manner. In this embodiment, the support arms 27 and 29 form one leg, respectively, of the supports 35.

Figure 2:
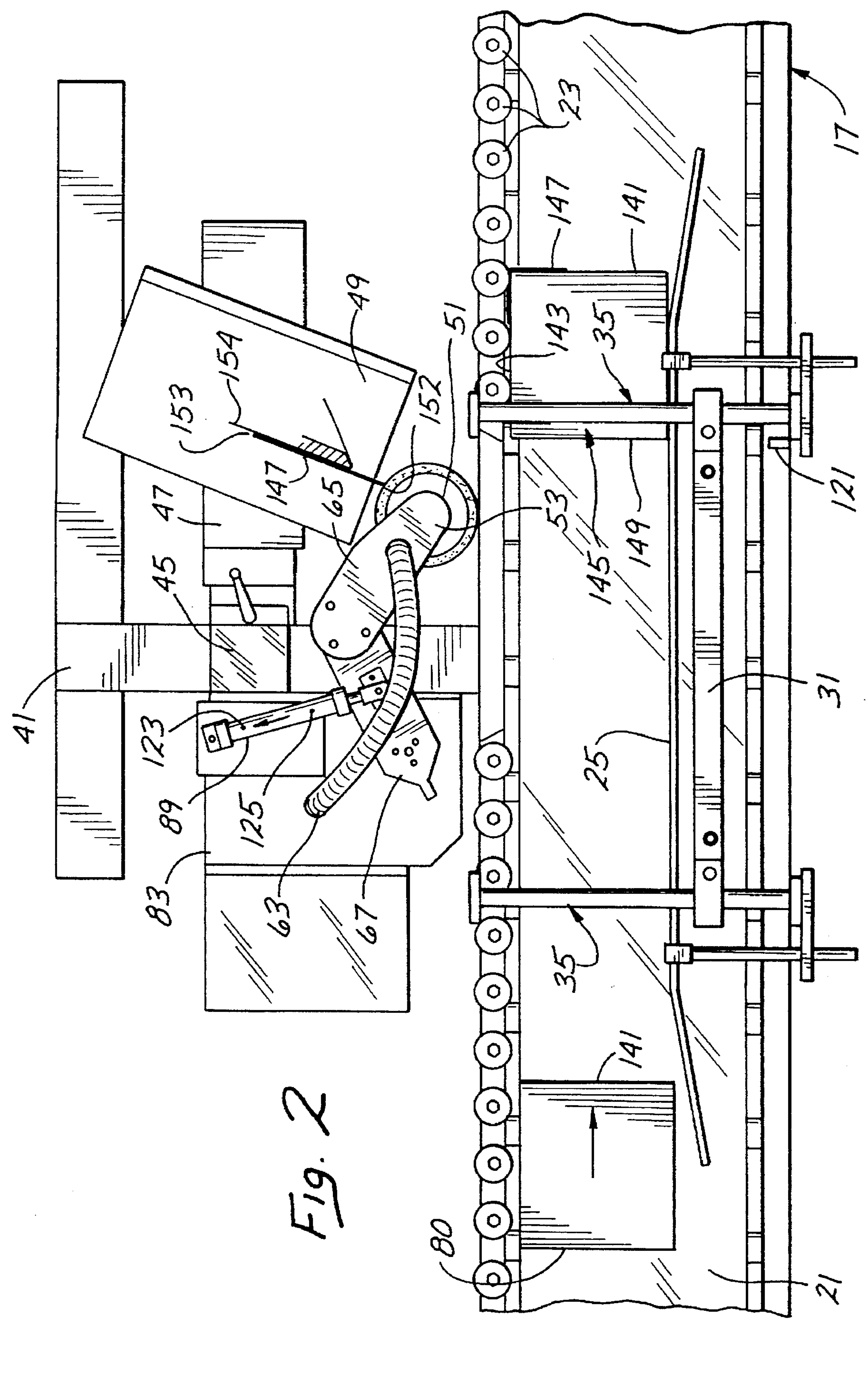
FIG. 2 is a fragmentary plan view of the label applicator with the label carrier in the label receiving position.

The label applying unit 15 includes a base 41 mounted on wheels 43, conventional leveling jacks (not shown) and a post 45 extending upwardly from the base for use in supporting various components of the label applying unit. With reference to FIG. 2, a yardarm 47 is coupled to the post 45 and together with the post and the base 41 form a major portion of the supporting structure for the label applying unit 15.

The label applying unit 15 also includes a label dispenser 49 and a label carrier 51 (FIG. 2). The label dispenser 49 is mounted on the yardarm 47. The label dispenser 49 is conventional and is therefore shown schematically in FIG. 2. In this embodiment, the label dispenser 49 is also capable of printing information on labels. Thus, the label dispenser 49 may print characters on a pressure sensitive adhesive label and dispense it onto the label carrier 51. Label dispensers with a thermal printing capability are known. For example, the label dispenser 49 may be of the type known as Prodigy obtainable from Fargo.

Figure 5:
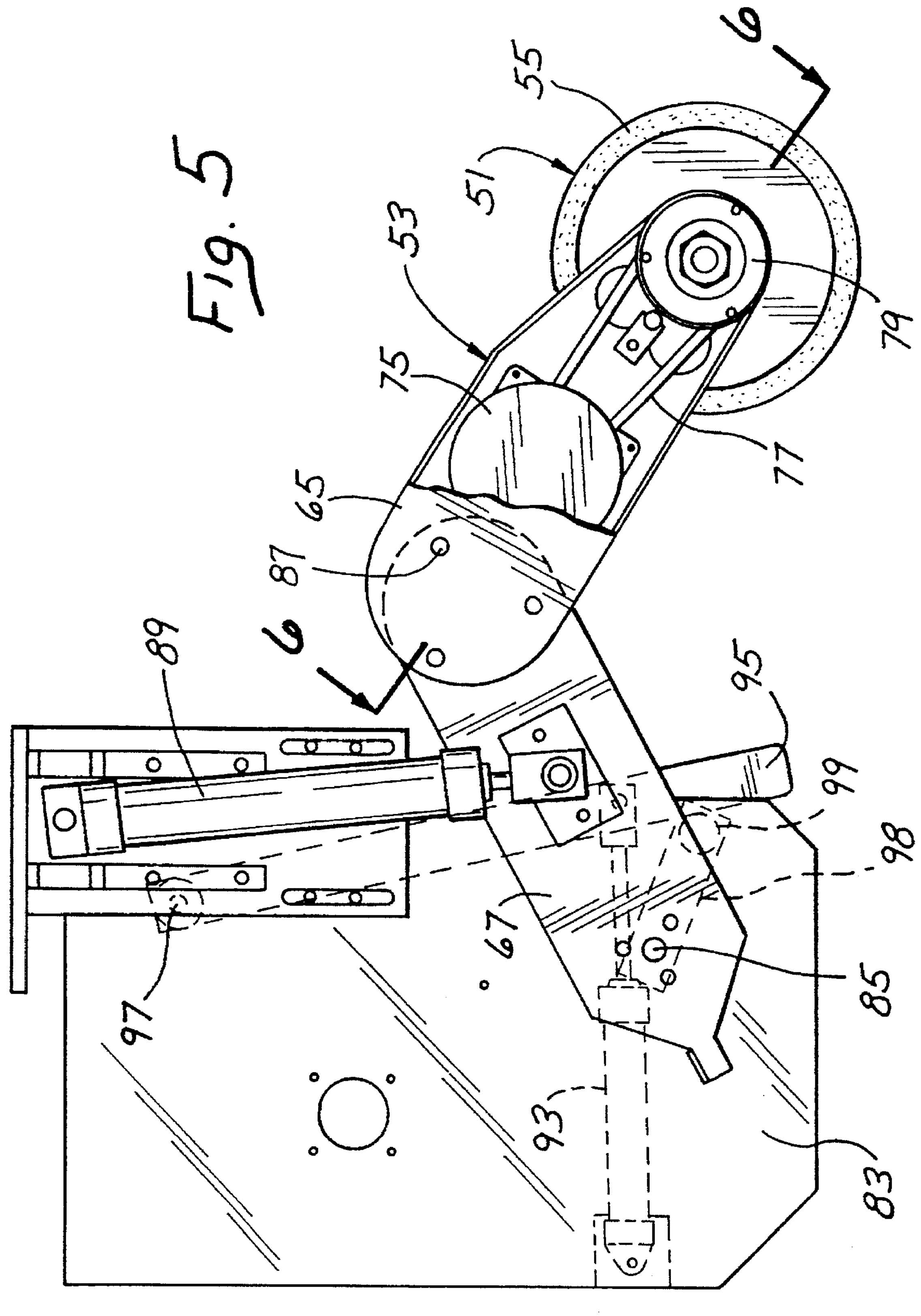
FIG. 5 is fragmentary plan view of the label applicator with parts removed and with the label carrier in the label receiving position.
Figure 6:
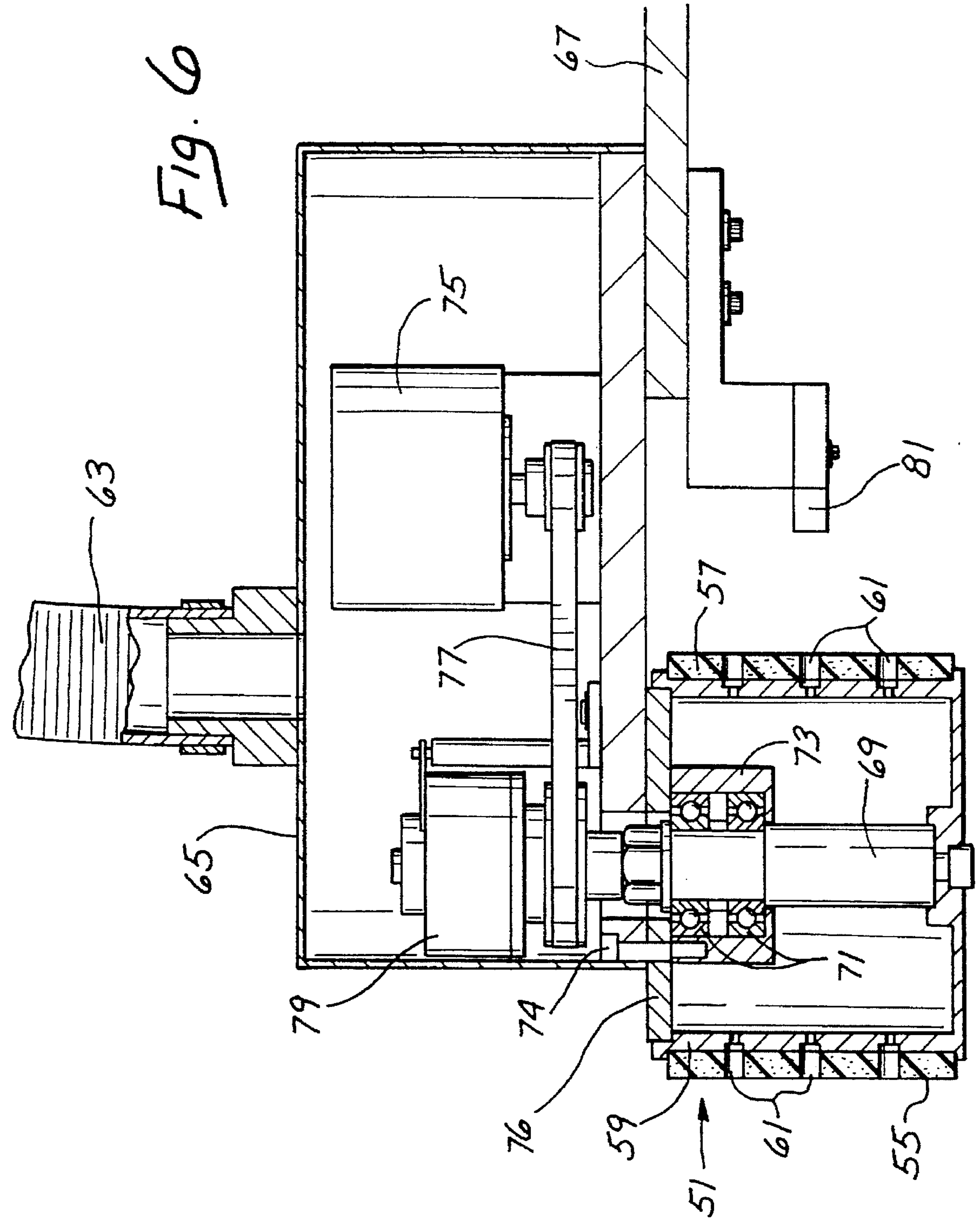
FIG. 6 is an enlarged sectional view taken generally along line 6—6 of FIG. 5.

The label carrier 51 is mounted for rotation on a carrier mount or arm 53. With reference to FIGS. 5 and 6, the label carrier is preferably in the form of a vacuum drum having a cylindrical peripheral surface 55 which, in this embodiment, is provided by a sleeve 57 of elastomeric material or other material having a relatively high coefficient of friction. Although the label carrier 51 can be of various different constructions, in this embodiment, it includes a cylindrical metallic drum 59 having a hollow interior and carrying the sleeve 57. A series of apertures 61 are provided in the peripheral wall of the carrier 51 and open at the peripheral surface 55. A flexible tube 63 (FIGS. 1 and 6) couple the interior of the label carrier 51 into a source (not shown) of subatmospheric pressure so that suction is available at the apertures 61 to releasably retain a label dispensed onto the peripheral surface 55 by the label dispenser 49.

The carrier mount 53 includes an outer hollow arm section 65 which serves as a vacuum box and an elongated plate-like inner arm section 67. The hollow nature of the arm section 65 enables it to convey subatmospheric pressure to the interior of the drum 51 and to serve as a housing for other components of the label applying unit 15. The label carrier 51 is mounted for rotation on the arm section 65 by a shaft 69 which in turn is rotatably mounted by bearings 71 retained in a bearing housing 73 affixed to the arm section 65 by fasteners 74 (only one being shown in FIG. 6), which also fixedly attach an end wall 76 to arm section 65.

The label carrier 51 is rotatable by a carrier drive which includes a motor 75, a belt drive 77 and a conventional clutch 79, all of which are mounted within the arm 65. With the clutch 79 engaged, the motor directly drives the label carrier 51, and with the clutch 79 disengaged, the label carrier 51 free wheels so that it can be driven by an external source independently of the motor 75. The end wall 76 does not rotate. For purposes of accurate control as described more fully below, the motor 75 is preferably a stepper motor and the clutch 79 may be of the type which is electronically operable. For example, the clutch 79 may be obtained from Electroid.

The motor 75 is stopped in response to a signal from a sensor 81 to thereby appropriately position a label dispensed onto the label carrier 51 so it can be applied to an article 80 (FIG. 2). The sensor 81 is an optical sensor fixedly mounted on the inner arm section 67 and directed radially toward the label carrier 51. The sensor 81 may function, for example, by directing light toward the peripheral surface 55 and responding to the intensity of the reflection received from the peripheral surface. Because the label releasably retained on the peripheral surface 55 is much more reflective than the peripheral surface 55, the sensor 81 can detect when either the leading edge of the label, i.e., the edge of the label which is first dispensed onto the label carrier 51 or trailing edge of the label, i.e., the last edge of the label dispensed onto the label carrier is aligned with the beam of light from the sensor and provides a signal in response to the change in reflection. To provide a sharper change in reflective intensity between the label and the peripheral surface 55, the peripheral surface 55 is preferably black. After the sensor 81 detects the leading or trailing edge of the label dispensed onto the label carrier, the motor 75 rotates through a predetermined angle, or undergoes a predetermined number of steps if the motor is a stepping motor, so that either the leading or trailing edge of the label will be at precisely the correct position when the label carrier 51 is in the label applying position as described more fully below. The number of steps taken by the motor 75 can be adjusted to accommodate variables such as label length.

Figure 3:
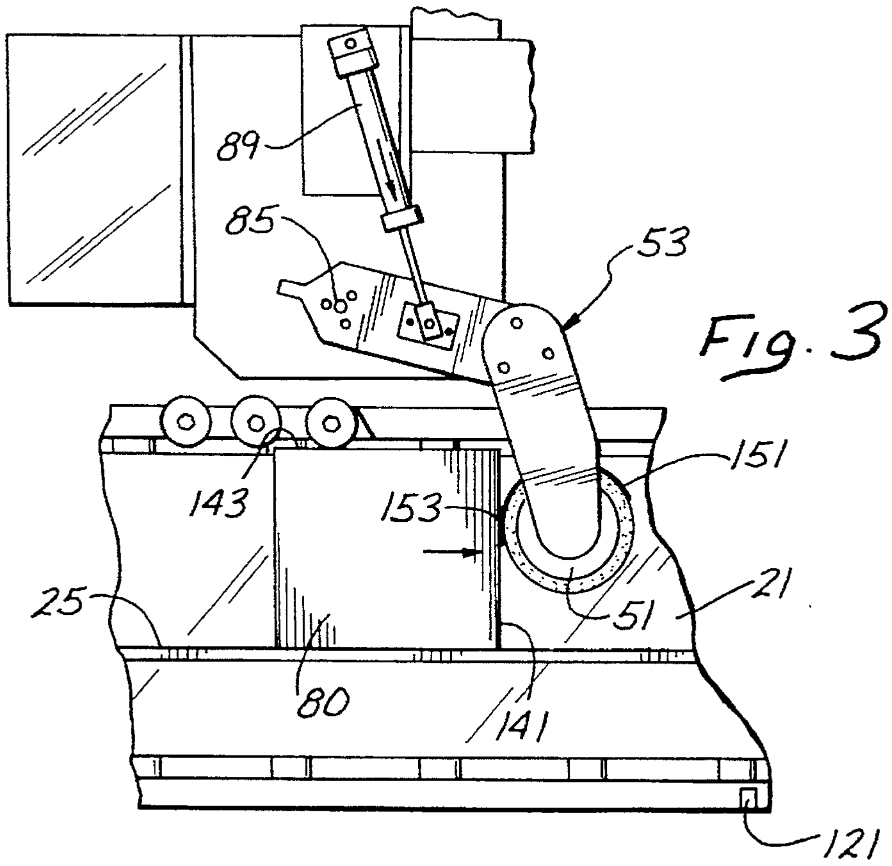
FIG. 3 is a fragmentary plan view of the label applicator with the label carrier in the label applying position and applying a label to a front face of an article.

The carrier mount 53 mounts the label carrier 51 on a base plate 83 (FIG. 5) which may be mounted on the post 45 and form part of the supporting structure. The label carrier 51 is mounted for bodily pivotal movement between a label receiving position (FIG. 2) in which the label carrier can receive and releasably retain a label and a label applying position (FIG. 3) in which the label carrier can apply the label to an article. Although this can be accomplished in different ways, in the illustrated embodiment a shaft 85 (FIG. 5) is coupled to the inner arm 67 and mounts the inner arm for pivotal movement on the base plate 83 in a suitable manner.

The arm sections 65 and 67 are coupled together to define an obtuse angle (FIG. 5) of less than 180° which opens in a first direction. The carrier mount 53 is reversible such that the obtuse angle can open in a second direction which is generally opposite to the first direction. This can be accomplished, for example, by utilizing removable fasteners 87 to couple the arm section 65 to the arm section 67. By removing the fasteners 87 and reattaching the arm section 65 to the arm section 67 in a different position, the obtuse angle will open in a different direction.

A motor in the form of a linear pneumatic actuator or cylinder 89 (FIGS. 2, 5, and 8) is pivotally coupled at one end to the inner arm section 67 and at the other end to a large bracket 91 (FIG. 8) which in turn is mounted on the base plate 83. The cylinder 89 can be used to pivot the carrier mount 53 between the label receiving and label applying positions. Another linear pneumatic actuator or cylinder 93 (FIGS. 5 and 7) is pivotally coupled at one end to the base plate 83 and at the other end to a pusher arm 95 which is pivotally mounted by a pin 97 to the base plate 83. A link 98 having a rotatable cam follower 99 at one end is fixed to the shaft 85 at its other end so that the link can pivot the shaft and hence the carrier mount 53. The air pressure applied to the cylinder 93 is always urging the cylinder 93 to retract, and consequently the pusher arm 95 is always held against the cam follower 99. The cylinder 93 operates under a regulated air pressure and functions as a constant force spring acting on the pusher arm 95 to resist movement of the carrier mount 53 from the label applying position toward the label receiving position. As described more fully below, the pusher arm 95, the link 98 and the cam follower 99 serve as a mechanical linkage which causes the label carrier 51 to exert a reduced force on the article 80 as the carrier mount 53 is moved from the label applying position toward the label receiving position.

The label applicator 11 also includes an article sensor 121 (FIG. 2), which may be mounted on the roller bed 17 and which can sense the leading and/or trailing edge of articles at the label applying station. The article sensor 121 may be a conventional optical or photocell type sensor commonly used for article sensing in label applicators.

The label applicator 11 also includes sensors 123 and 125 (FIG. 2) on the cylinder 89. The sensor 123 provides a signal when the cylinder 89 is nearly fully retracted and the sensor 125 provides a signal when the cylinder 89 is nearly fully extended. The sensors 123 and 125 may be of the Reed switch type which are available with pneumatic actuators to indicate the extended and retracted positions of the actuator. The signals from the sensors 121, 123 and 125 as well as from the sensor 81 can be used in various ways to control the label applicator 11 and a preferred utilization of the signals is described below.

With the components of the label applicator 11 as shown in FIG. 2, the label applicator is able, for example, to label a forward face 141 and the left side face 143 of another article 80 (FIG. 2). As shown in FIG. 2, the article 145 has had a label 147 applied to the forward face 141 and the left side face 143 by the label applicator 11. Although the article 80 could be round or of virtually any shape, in this example the article 80 is a rectangular box in which the faces of the box are flat and mutually perpendicular.

With the label carrier 51 in the label receiving position, the sensor 123 provides a signal indicating that the cylinder 89 is fully retracted. In response to this signal, the motor 75 (FIGS. 5 and 6) is energized, the clutch 79 (FIGS. 5 and 6) is engaged so that the motor 75 rotates the label carrier 51 and another label 147 is dispensed. Although two or more labels could be dispensed, in this example, only a single label is dispensed onto the label carrier 51. The label 147 (FIG. 2) which has a leading edge 152 and a trailing edge 153 is peeled from a web or backing strip 154 in a conventional manner and is dispensed by the label dispenser 49 on to the peripheral surface 55 of the label carrier 51. The label is a pressure sensitive adhesive label and may or may not have information printed thereon applicable to the particular article 80 (FIG. 2) to which the label is to be applied. The tangential velocity of the label carrier 51 must be at least as great as the velocity at which the label dispenser 49 dispenses the label onto the peripheral surface 55. Vacuum pressure is continuously supplied by the vacuum pump or other source of reduced pressure through the flexible tube 63 and the outer arm 65 to the interior of the label carrier 51. Consequently, the label dispensed onto the label carrier 51 is releasably retained on the peripheral surface 55 by the subatmospheric pressure within the label carrier.

As the label is being dispensed by the label dispenser 49 onto the label carrier 51, the leading edge of the label is detected by the sensor 81 (FIG. 6). In response to this signal, the motor 75 takes a predetermined number of steps based upon the length of the label so that the trailing edge of the label will be in the correct position to be adhered to the front face 141 of the article 80 (FIG. 2) to which it is to be applied when the label carrier 51 is in the label applying position.

The sensor 121 detects when the rear face 149 of the previously labeled article 145 has left the label applying station. This signal from the sensor 121 is used to energize the cylinder 89 to cause the cylinder to extend and move the label carrier 51 and the carrier mount 53 to the label applying position. However, this will not occur if for any reason the label dispenser 49 has not completely dispensed a label onto the label carrier 51. For this purpose, a signal may be received from the label dispenser 49 indicating that dispensing of the label has been completed and this would commonly occur upon cessation of movement of the web or backing strip which carries the roll of labels dispensed by the dispenser.

In the label applying position, the cylinder 89 is fully extended so that a signal from the sensor 125 is obtained which causes the clutch 79 (FIGS. 5 and 6) to disengage so that the label carrier 51 can rotate independently of the motor 75. Also in this position, all of the air is exhausted from the cylinder 89 so that the cylinder 93 is the only force that keeps the label carrier 51 and the carrier mount 53 in the label applying position. The cylinder 93 operates under regulated air pressure and acts as a constant force spring.

Figure 4:
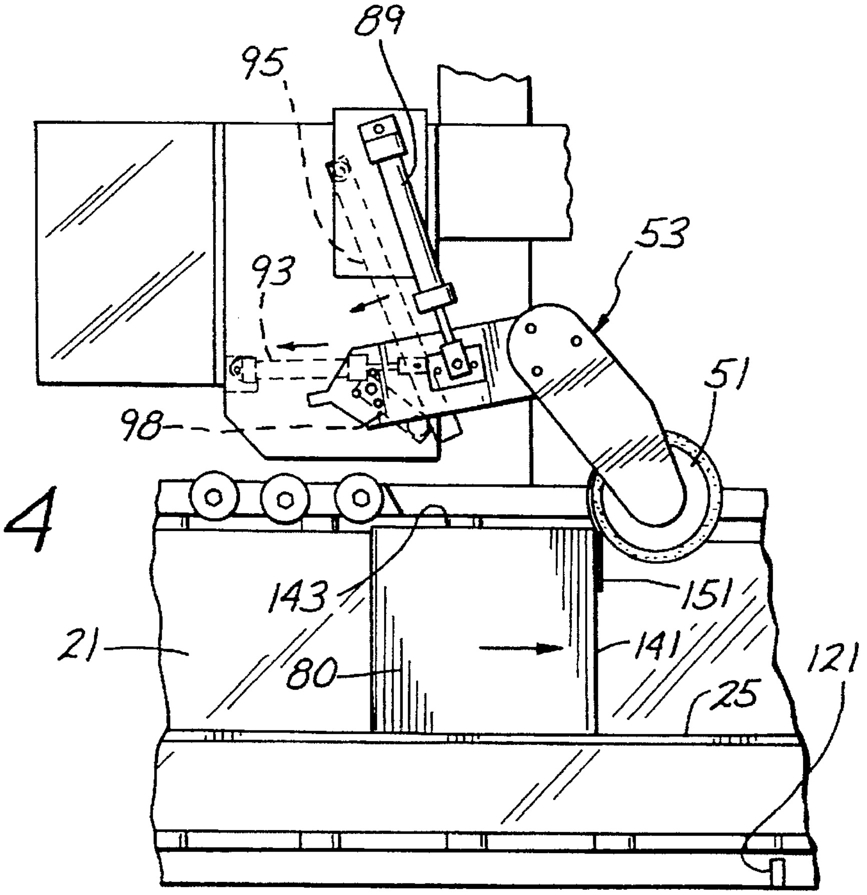
FIG. 4 is a view similar to FIG. 3 with the label carrier beginning to apply the label to a left side face of the article.

In the label applying position, the label carrier 51 with a label 151 (FIG. 3) awaits the article 80 which is being moved along by the belt 21. More specifically, the trailing edge 153 of the label 151 is held in precisely the correct position so it can be adhered to the forward face 141 at the desired location. Thus, contact between the forward face 141 and the trailing edge 153 adheres the trailing edge to the forward face. The conveyor belt 21 moves the article 80 continuously in the direction of the arrow in FIG. 3 and the article pushes the carrier mount 53 to the right as viewed in FIG. 3 with the carrier mount pivoting about the shaft 85 and with the label carrier 51 being rolled along the forward face 141 and ultimately down the left side face 143 (FIG. 4). During this pivoting movement of the carrier mount 53, the cylinder 93 keeps the label carrier 51 biased against the article 80.

Figure 7:
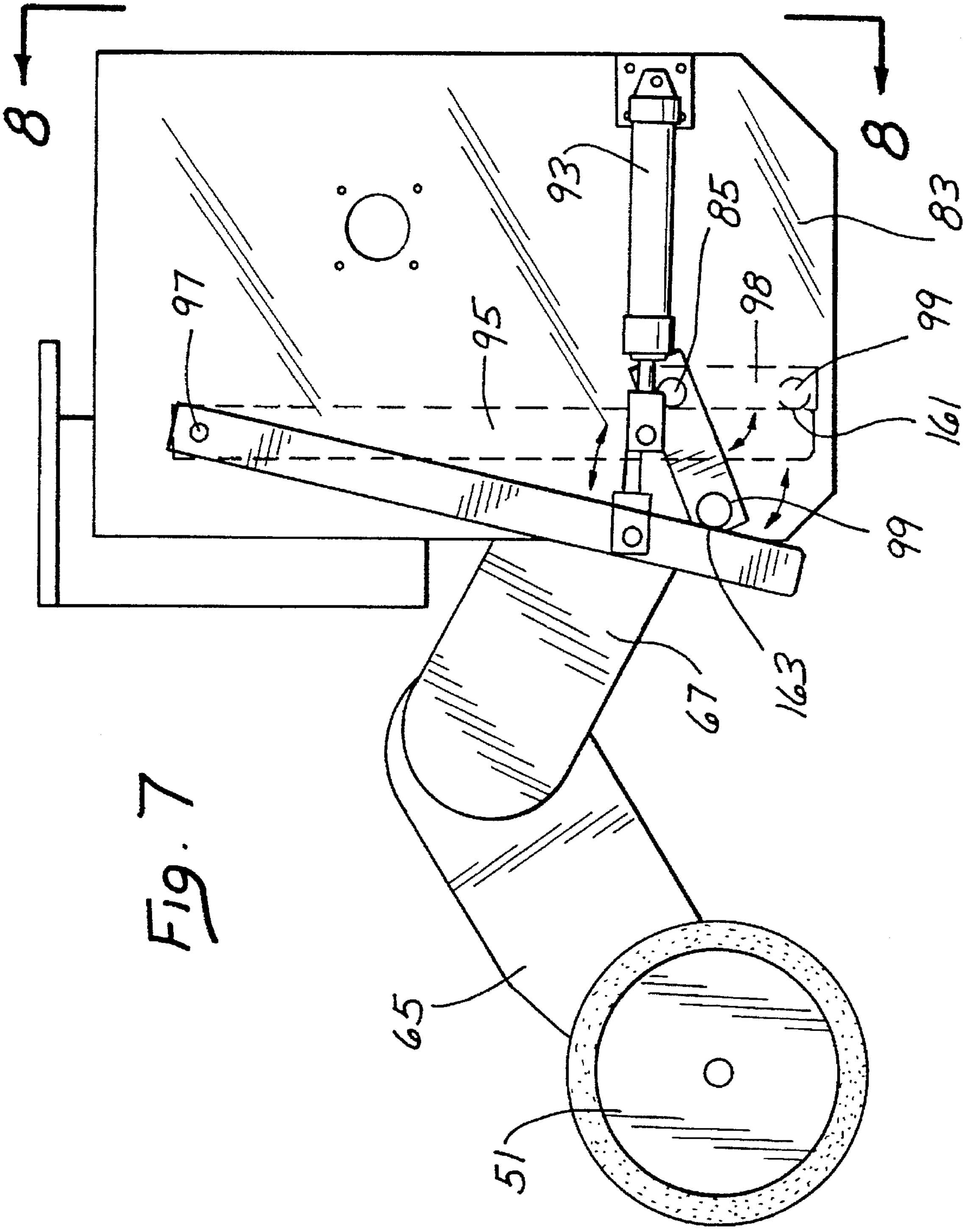
FIG. 7 is a bottom plan view of the construction shown in FIG. 5.
Figure 8:
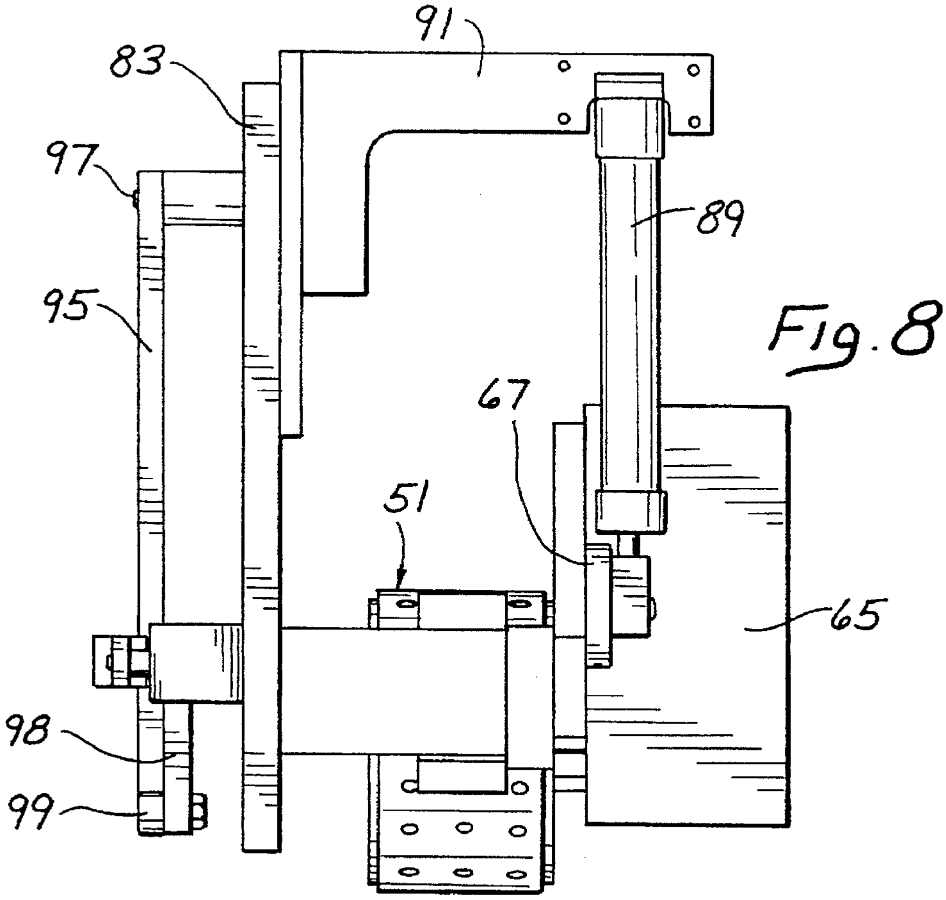
FIG. 8 is an elevational view taken generally along line 8—8 of FIG. 7.

As the label carrier 51 rolls along the forward face 141, the carrier mount 53 is pivoted by the moving article 80 from the label applying position back toward the label receiving position. During this rolling movement of the label carrier 51 along the forward face 141, the pusher arm 95, the link 98 and cam follower 99 serve as a mechanical linkage which causes the label carrier to exert a reduced force on the article 80 as the carrier mount is moved back toward the label receiving position. This is the result of the point of contact between the cam follower 99 and the pusher arm 95 changing to shorten the effective length of the lever provided by the pusher arm 95. As shown in FIG. 7, the pusher arm 95 and the link 98 are parallel with the label carrier 51 in the label applying position and in the solid line configuration, the label carrier is in the label receiving position. As the label carrier 51 is pushed by the article 80 from the label applying position (the dashed line position in FIG. 7) toward the label receiving position (the full line position shown in FIG. 7) the point of contact between the rotatable cam follower 99 and the pusher arm 95 moves from a point 161 near the distal end of the pusher arm 95 to a point 163 which is spaced inwardly a greater distance from the distal end of the pusher arm 95. Consequently, the effective length of the lever formed by the pusher arm 95 is shortened during this movement of the label carrier 51 and the carrier mount 53 with the result that the label carrier exerts a progressively reduced force on the forward face 141 of the article as the label carrier moves toward the left front corner of the article 80. Consequently, with the label carrier 51 applying this reduced force, it is easier for the label carrier to roll around the corner and so hang up of the label carrier at the corner of the article 80 is much less likely to occur.

After the label 151 is fully adhered to the left side face 143, the forward face 141 passes in front of the sensor 121 and is detected. This provides a signal to retract the cylinder 89 to bring the label carrier 51 back to the label receiving position of FIG. 2. When the label receiving position is reached, the cylinder 89 is in the fully retracted position whereupon the sensor 123 provides a signal to again energize the motor 75 and engage the clutch 79 whereupon the cycle is repeated.

The signals from the various sensors can be processed in any suitable way to bring about the desired movements of the various components of the label applicator 11 and the specific manner in which these signals are processed forms no part of this invention. For example, software and a suitable microprocessor are preferred for processing of these signals to bring about the desired sequence of movements of the components of the label applicator.

One feature of this invention is that it can be used with virtually any length of label and can accurately apply labels of different lengths. Thus, to adapt the label applicator 11 for labels of different lengths, it is only necessary to cause the stepper motor 75 to rotate the label carrier 51 through a larger or smaller angle to appropriately position either the leading or trailing edge of the label when the label carrier is in the label applying position. In addition to labeling the left front corner of the article 80 (FIGS. 3 and 4), the label applicator 11 can label the right rear of the article 80 (FIG. 9) by moving the label applying unit 15 to the other side of conveyor belt 21 as shown in FIG. 9. Except as noted below, the right rear corner of the article 80 can be labeled in the same manner as described above for the left front corner.

To accomplish right rear corner labeling (FIG. 9) a label is dispensed and the label carrier 51 is rotated by the motor 75 to accurately position the leading edge of the label 147. The sensor 81 detects the trailing edge of the label and the motor 75 rotates the label carrier 51 to position the label. When the trailing edge of the article 80, i.e. the rear face 157 passes in front of and is sensed by the sensor 121, it provides a signal which de-energizes the clutch 79 (FIGS. 5 and 6) and actuates the cylinder 89 which pivots the carrier mount 53 to place the label carrier 51 into contact with the right side 155 (FIG. 9) of the article 80. The air pressure is held on the cylinder 89 keeping the label carrier 51 in contact against the side face 155. The movement of the article 80 on the conveyor belt 21 causes the label carrier 51 to rotate and adhere the label 147 to the right side face 155. On reaching the corner of the article 80, the label carrier 51 rolls around the corner and follows the rear face 157 of the article and this applies another region of the label to the rear face. When the cylinder 89 is fully extended, the sensor 125 senses this condition and immediately retracts the cylinder and the carrier mount 53 to the label receiving position. The cylinder 93 is not used for rear corner labeling, i.e. applying a label to any corner which includes the rear face 157.

Figure 11:
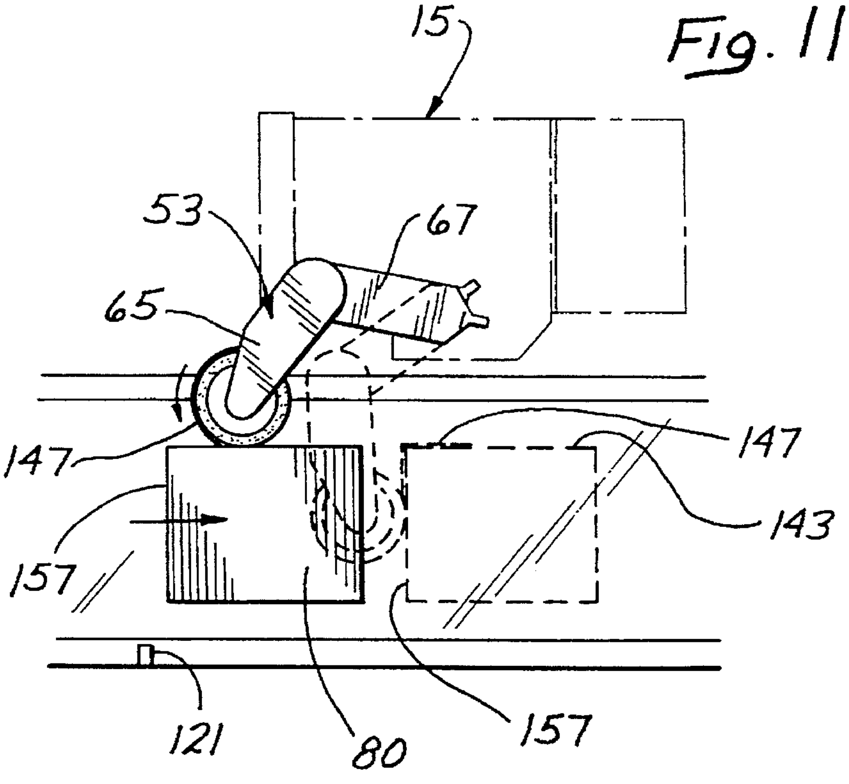

The same features of the invention described above for left front and right rear corner labeling can be used for right front (FIG. 10) and left rear corner (FIG. 11) labeling. However, it is necessary to assemble the label applicator 11 in what might be called a left hand unit as shown in FIGS. 10 and 11. When assembled in this fashion, the front right corner of the article 80 is labeled in the same manner as described above for the left front corner (FIGS. 3 and 4) except that it is preferred that the label carrier 51 be positioned in the label applying position so that the leading edge 152 of the label 147 is retained in the desired position. Labeling the left rear corner of the article 80 can be carried out in the same manner as described above for labeling of the right rear corner.

Although an exemplary embodiment of the invention has been shown and described, many changes, modifications and substitutions may be made by one having ordinary skill in the art without necessarily departing from the spirit and scope of this invention.

We claim:

1. A method of applying label portions to first and second faces of an article which is moving along a path wherein the first and second faces face in different directions, said method comprising:

dispensing the label portions onto a rotatable label carrier with the label carrier rotating and with the label carrier in a label receiving position;

moving the label carrier from the label receiving position to a label applying position;

releasably retaining said label portions on said rotatable label carrier in the label applying position in the path of movement of said article;

terminating rotation of the label carrier prior to said step of contacting the first face of the article to position the first label portion;

contacting the first face of the article with a first label portion as the article moves along the path and rotating the label carrier about a rotational axis to apply said first label portion to said first face of the article;

contacting the second face of the article with a second label portion as the article moves along the path and rotating the label carrier about the rotational axis to apply said second label portion to said second face of the article; and moving the label carrier along at least one of said faces of the article as one of the label portions is being applied to said one face.

2. A method as defined in claim 1 wherein the step of moving the label carrier along at least one of said faces of the article includes pivoting the label carrier about a pivot axis which is spaced from said rotational axis.

3. A method as defined in claim 2 wherein the step of moving the label carrier along at least one of said faces of the article includes using the moving article to move the label carrier along said one face.

4. A method as defined in claim 1 wherein said step of rotating the label carrier to apply said first label portion includes using the moving article to rotate the label carrier.

5. A method as defined in claim 1 wherein the first and second faces are front and side faces, respectively, of the article.

6. A method as defined in claim 1 wherein the first and second faces are back and side faces, respectively, of the article.

7. A method as defined in claim 1 wherein the first and second faces are front and side faces, respectively, of the article and including using the label carrier for applying a label portion to each of a back face and a side face of another article as such another article is moved along said path.

8. A method of applying label portions to first and second faces of an article which is moving along a path wherein the first and second faces face in different directions and said first face is one of a front and back face of the article and said second face is a side face of the article, said method comprising:

dispensing the label portions onto a rotatable label carrier with the label carrier rotating and with the label carrier in a label receiving position;

moving the label carrier from the label receiving position to a label applying position;

releasably retaining said label portions on said rotatable label carrier in the label applying position in the path of movement of said article;

contacting the first face of the article with a first label portion as the article moves along the path and rotating the label carrier about a rotational axis to apply said first label portion to said first face of the article;

contacting the second face of the article with a second label portion as the article moves along the path and rotating the label carrier about the rotational axis to apply said second label portion to said second face of the article; and moving the label carrier along at least one of said faces of the article as one of the label portions is being applied to said one face;

wherein each of the steps of rotating includes using the moving article to rotate the label carrier, and said method includes pivoting the label carrier from the label receiving position to the label applying position and terminating rotation of the label carrier prior to said step of contacting the first face of the article to position the first label portion.

9. A method as defined in claim 1 including pivoting the label carrier about a pivot axis from the label receiving position to the label applying position.

10. A method as defined in claim 9 wherein said step of moving includes using the moving article to pivot the label carrier about said pivot axis to thereby move the label carrier along said face.

11. A method of applying a label to an article comprising:

dispensing a label onto a label carrier with the label carrier rotating and with the label carrier being in a label receiving position;

moving the label carrier from the label receiving position to a label applying position;

terminating rotation of the label carrier to position the label; and applying the label on the label carrier to the article by forcing the label against the article and with the article acting to rotate the label carrier as the label is applied to the article.

12. A method of applying label portions to first and second faces of an article which is moving along a path wherein the first and second faces face in different directions, said method comprising:

dispensing the label portions onto a rotatable label carrier with the label carrier rotating and with the label carrier in a label receiving position;

moving the label carrier from the label receiving position to a label applying position;

releasably retaining said label portions on said rotatable label carrier in the label applying position in the path of movement of said article;

contacting the first face of the article with a first label portion as the article moves along the path and rotating the label carrier about a rotational axis to apply said first label portion to said first face of the article;

contacting the second face of the article with a second label portion as the article moves along the path and rotating the label carrier about the rotational axis to apply said second label portion to said second face of the article; and moving the label carrier along at least one of said faces of the article as one of the label portions is being applied to said one face;

wherein the steps of contacting the first and second faces of the article each include the step of applying a force, in addition to any applied gravitational force, to bias the label carrier toward the article, and the moving step further includes the step of regulating the non-gravitational biasing force as a function of position of the label carrier as it is moved along at least one of the faces.

13. A method as defined in claim 12, wherein the biasing force is reduced as the label carrier is moved along at least one of the faces.

14. A method as defined in claim 11, and further including the step of applying a force to bias the label carrier toward the label applying position, the label applying step further including the step of regulating the biasing force as the label is applied to the article.

15. A method as defined in claim 11, and further including the step of permitting the moving article to pivot the label carrier about a pivot axis to thereby move the label carrier along the face of the article.

16. A method of applying label portions to first and second adjoining faces of an article which is moving along a path, wherein the first and second faces are oriented in different directions, the method comprising:

receiving label portions on a rotatable label carrier in a label receiving position;

moving said label carrier to a label applying position in the path of movement of the article and applying a force, in addition to any applied gravitational force, to bias the label carrier toward the label applying position;

contacting the first face of the article with a first label portion as the article moves along the path and rotating the label carrier about a rotational axis to apply said first label portion to said first face of the article;

regulating the biasing force on the label carrier as a function of position of the label carrier in relation to the label receiving position, excluding the effects of gravity; and contacting the second face of the article with a second label portion as the article moves along the path and rotating the label carrier about the rotational axis to apply the second label portion to the second face of the article.

17. A method as defined in claim 16, wherein the step of regulating the biasing force includes reducing the biasing force as the label carrier is moved closer to the label receiving position.

18. A method of applying a label portion to a face of an article which is moving along a path, the face having a generally transverse orientation with respect to said path, the method comprising:

receiving a label portion on a rotatable label carrier in a label receiving position;

rotating the label carrier about a rotational axis in said receiving position;

moving said label carrier to a label applying position in the path of movement of the article;

terminating rotation of the label carrier; and contacting the generally transverse face of the article with the label portion as the article moves along the path and rotating the label carrier about said rotational axis to apply said label portion to said article face, such that there is rolling contact between the label carrier and the article to be labeled as the label carrier is moved along the path in which the article to be labeled is being conveyed.

19. A method as defined in claim 18, and further including the step of applying a second label portion to a second face of the article, the second face being oriented in a generally transverse direction with respect to the first face.

20. A method of applying a label from a label carrier to adjoining front and side faces of an article which is moving along a path, about a corner formed along the intersection of the two faces, the label carrier having a moving element for moving the label into a desired position while it is releasably retained on the label carrier, said method comprising:

receiving a discrete label on the label carrier moving element in a label receiving position, such that the label is disposed in its entirety on said label carrier moving element;

moving the label carrier to a label applying position;

releasably retaining the label on the label carrier in the label applying position in the path of movement of said article;

moving the label into a desired position on the label carrier moving element, so that the label is in contact with the front face to apply a first region of the label to the front face;

contacting the front face of the article with the first region of the label as the article moves along the path so that the first region of the label is adhesively applied to the front face and a second region of the label extends beyond said corner;

contacting the side face of the article with the second region of the label so that the second region of the label is adhesively applied to the side face; and moving the label carrier away from the label applying position.

21. A method as defined in claim 20, wherein the label carrier is moved to move the second region of the label into contact with the side face of the article.

* * * * *